United States Patent
Moghaddam

(10) Patent No.: US 7,076,473 B2
(45) Date of Patent: Jul. 11, 2006

(54) CLASSIFICATION WITH BOOSTED DYADIC KERNEL DISCRIMINANTS

(75) Inventor: Baback Moghaddam, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 760 days.

(21) Appl. No.: 10/126,762

(22) Filed: Apr. 19, 2002

(65) Prior Publication Data

US 2003/0200188 A1 Oct. 23, 2003

(51) Int. Cl.
  G06F 15/18 (2006.01)
  G06N 3/02 (2006.01)
  G06N 3/08 (2006.01)

(52) U.S. Cl. .......................................... 706/20; 706/16
(58) Field of Classification Search ..................... None
  See application file for complete search history.

(56) References Cited

OTHER PUBLICATIONS

King-Shy Goh et al., SVM Binary Classifier Ensembles for Image Classification, 2001, ACM I-581 13436-3/01/0011.*

Khalid Al-Kofahi et al., Combining Multiple Classifiers for Text Categorization, 2001, ACM I-581 13436-3/01/0011.*

* cited by examiner

*Primary Examiner*—Anthony Knight
*Assistant Examiner*—Nathan H. Brown, Jr.
(74) *Attorney, Agent, or Firm*—Dirk Brinkman; Andrew J. Curtin

(57) ABSTRACT

A method learns a binary classifier for classifying samples into a first class and a second class. First, a set of training samples is acquired. Each training sample is labeled as either belonging to the first class or to the second class. Pairs of dyadic samples are connected by projection vectors such that a first sample of each dyadic pair belonging to the first class and a second sample of each dyadic pair belonging to the second class. A set of hyperplanes are formed so that the hyperplanes have a surface normal to the projection vectors. One hyperplane from the set of hyperplanes is selected that minimizes a weighted classification error. The set of training samples is then weighted according to a classification by the selected hyperplane. The selected hyperplanes are combined into a binary classifier, and the selecting, weighting, and combining are repeated a predetermined number of iterations to obtain a final classifier for classifying test samples into the first and second classes.

14 Claims, 6 Drawing Sheets

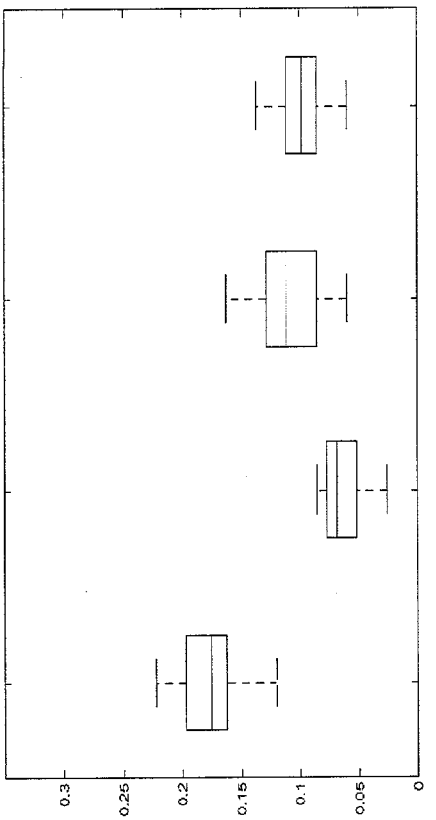
*Fig. 4b Ionosphere*
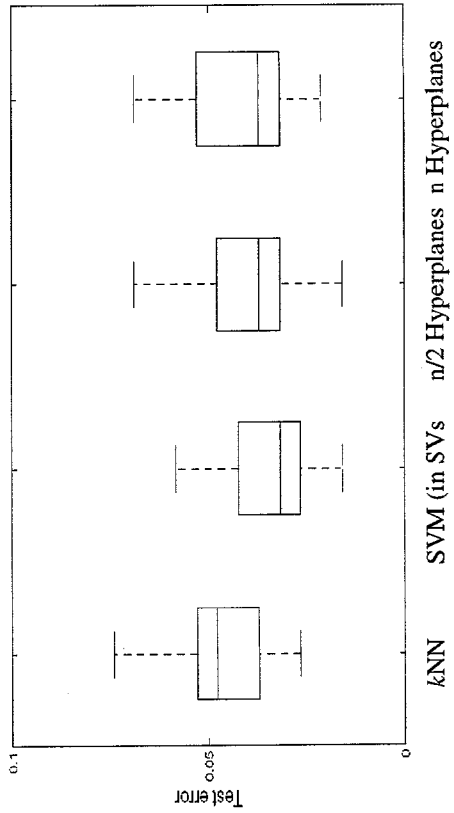
*Fig. 4d Breast Cancer*
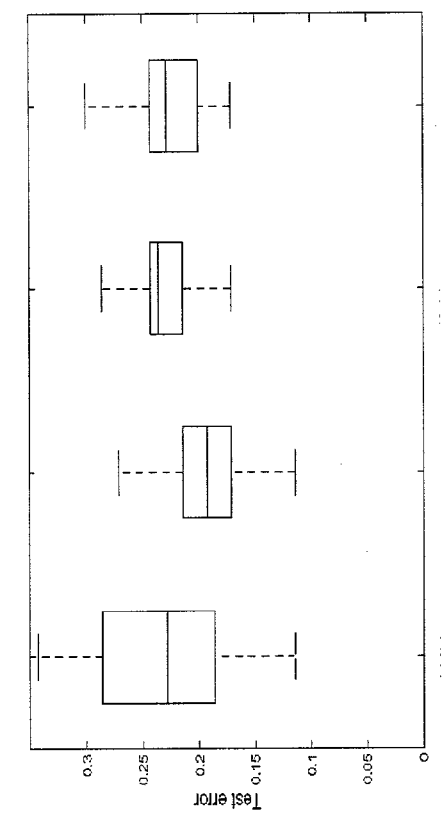
*Fig. 4a Sonar*
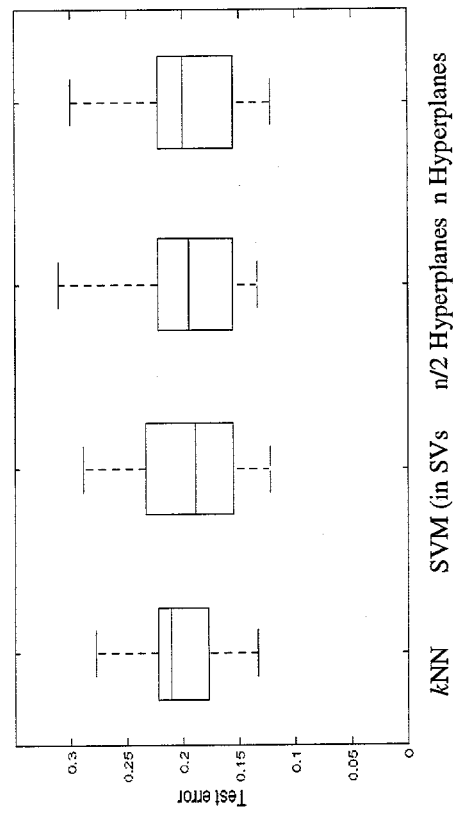
*Fig. 4c. Hear*

CLASSIFICATION WITH BOOSTED DYADIC KERNEL DISCRIMINANTS

FIELD OF THE INVENTION

This invention relates generally to classifying data and signals, and more particularly to classifying with binary discriminants.

BACKGROUND OF THE INVENTION

A frequent problem in signal and data processing is one of classification. For many applications, e.g., astronomy, meteorology, medicine, and image processing, samples of the input signal or input data set need to be separated into two distinct classes. For example, in vision systems where faces are recognized from images, it is often desired to classify a face as either female or male. In clinical trials, classification of statistical data can be used to study diseases. To solve this type of problem, binary classifier or discriminants are used. When the signal is complex, e.g., a signal where data samples have a high dimensionality and a simple classifier is not directly obvious, it is first necessary to "learn" the discriminant from a training signal or data samples themselves.

In machine learning of binary classifiers, two techniques are most commonly used: boosting and kernels. One well known boosting algorithm is Adaboost, see Freund et al., "A decision-theoretic generalization of on-line learning and an application to boosting," Journal of Computer and System Sciences, 55, pp. 119–139, 1995, Shapire et al., "Boosting the margin: a new explanation for the effectiveness of voting methods," Proc. 14th Inter. Conf. on Machine Learning, pp. 322–330, 1997, and Scholkopf et al., "Nonlinear component analysis as a kernel eigenvalue problem," Neural-Computation, 10, pp. 1299–1319, 1998.

Boosting is used to build strong classifiers from a collection of weak classifiers that usually perform only slightly better than chance. Analysis of AdaBoost and other "voting" type classification methods have explained the apparent tendency of boosting to maximize the margin in the resulting classifier, thus preventing overfitting and improving the generalization performance. However, maximizing the margin directly is a relatively complex optimization task.

Mercer kernels have been used as an implicit mapping mechanism which, when used for classification tasks, make linear discriminants in a transformed feature space correspond to complex non-linear decision boundaries in the input or training data space, see Boser et al., "A training algorithm for optimal margin classifiers," Proc. 5th Annual ACM Workshop on Computational Learning Theory, pp. 144–152, 1992. Kernel methods have also been used to build non-linear feature spaces for principal component analysis (PCA), as well as Fisher's linear discriminant analysis (LDA).

The most familiar example of kernel mapping is used in non-linear support vector machines (SVMs), see Vapnik, "The nature of statistical learning theory," Springer, 1995. In SVMs, the classification margin, and thus the bound on generalizaton, is maximized by a simultaneous optimization with respect to all the training samples. In SVMs, samples can be quite close to the decision boundary, and the support vectors are simply the minimal number of training samples needed to build, i.e., support, the decision boundary. The support vectors are almost certainly not "typical" or high-likelihood members of either class. Also, in the case of SVMs, there is usually no direct way of controlling the number of support vectors that are produced.

Therefore, there is a need for a classification method that simplifies the optimization task. It is also desired to bound the number of discriminants used during classification.

SUMMARY OF THE INVENTION

The invention provides a method for binary classification of data signals with hyperplane discriminants. These dyadic hyperplanes are based on pairs of training samples from opposite classes. The method is further extended to non-linear discriminants by using kernel functions satisfying Mercer's theorem.

During training, a set of dyadic hyperplanes is learned by means of a confidence-rated boosting. An optimal hyperplane is selected during each iteration of boosting from a finite set of classifiers. Selected hyperplanes are then combined into a final classifier. Thus, the number of possible classifiers is bounded.

The method according to the invention learns complex binary classifiers by superposition of hyperplane discriminants. Each discriminant is based on a projection onto a vector connecting an opposing pair of training samples. That is, a "dyadic" pair consists of two samples with opposite labels, e.g., samples of a first set are labeled $-1$, and samples of a second set are labeled $+1$. The learning process itself is based on a "fuzzy" real-valued variant of AdaBoost, and the hyperplane classifiers use kernels of the type used by SVMS for mapping linearly non-separable problems to high-dimensional non-linear feature spaces.

When the concept class consists of linear discriminants, i.e., hyperplanes, this amounts to using a linear hyperplane orthogonal to the vector connecting the dyadic pair. By applying the same notion of linear hyperplanes to a non-linearly transformed feature space obtained by Mercer type kernels, non-linear discriminants similar in form to SVMs can be provided.

With boosting, the search for candidate hyperplanes explores the space of all dyadic classifiers. This space of possible classifiers spans the subspace of the training data, and the optimal hyperplane discriminant must reside in this subspace. This notion is readily extended to non-linear classifiers obtained by kernel transformations, by noting that in the feature space, the optimal discriminant resides in the span of the transformed data. Therefore, in both linear and non-linear classification problems, dyadic hyperplanes according to the invention form an efficient search strategy for exploring the space of all classifiers.

In the absence of any prior knowledge regarding the optimal hyperplane, the training data are its own best discriminant, a principle that also forms the basis for prior art k-NN and SVM classifiers.

More particularly, a method learns a binary classifier for classifying samples into a first class and a second class. First, a set of training samples are acquired. Each training sample is labeled as either belonging to the first class or to the second class.

Pairs of dyadic samples are connected by projection vectors such that a first sample of each dyadic pair belonging to the first class and a second sample of each dyadic pair belonging to the second class.

A set of hyperplanes are formed so that the hyperplanes have a surface normal to the projection vectors. One hyperplane from the set of hyperplanes is selected that minimizes a weighted classification error.

Then, the set of training samples is then weighted according to a classification by the selected hyperplane. The selected hyperplanes are combined into a binary classifier, and the selecting, weighting, and combining are repeated a predetermined number of iterations to obtain a final classifier for classifying test samples into the first and second classes.

BRIEF DESCRIPTION OF THE DRAWINGS

FIGS. 4a–d are box plots of classification errors for application data sets;

DETAILED DESCRIPTION OF THE PREFERRED EMBODIMENT

Hyperplane Discriminants

Figure 6:
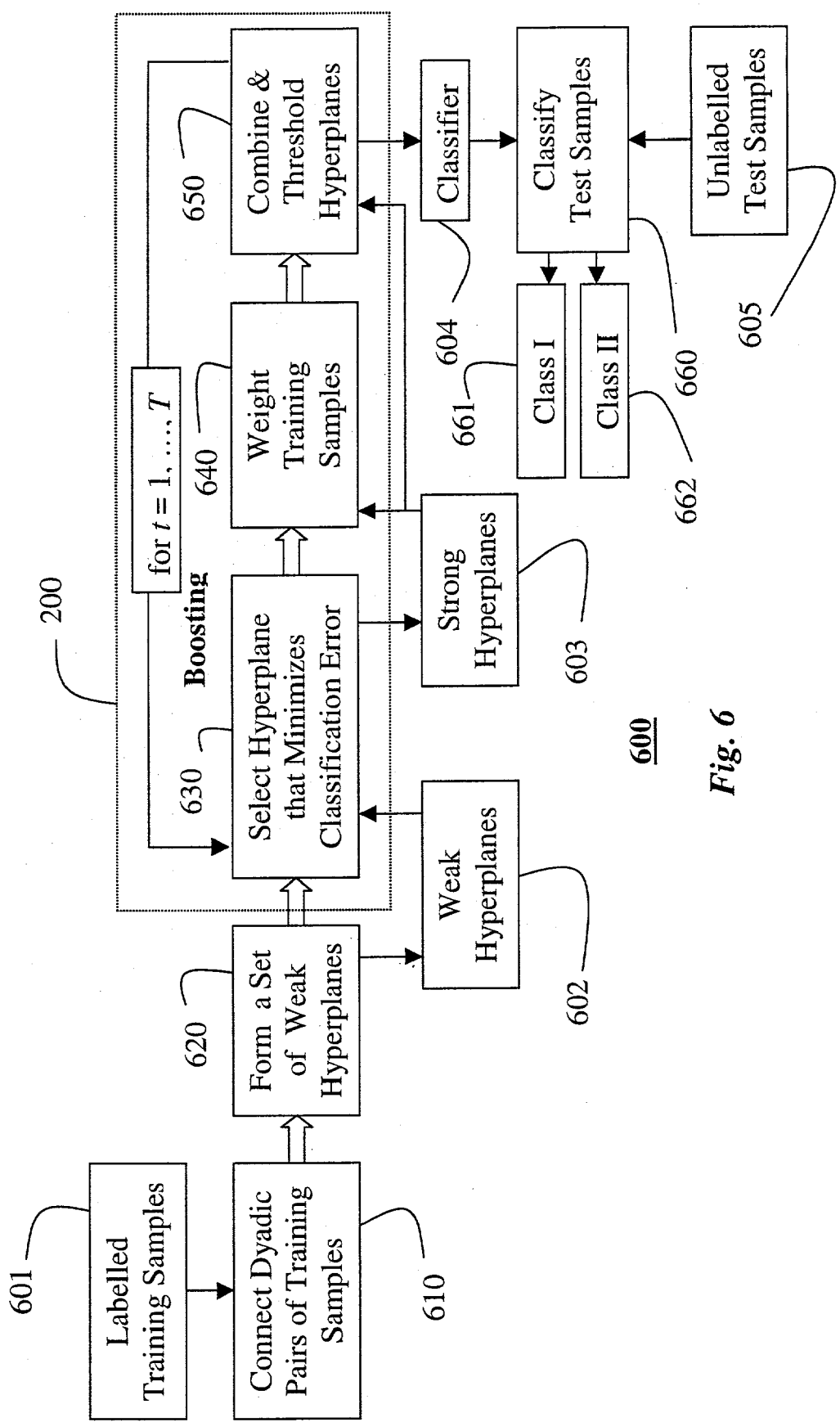
FIG. 6 is flow diagram of a method for learning a binary classifier according to the invention.

FIG. 6 shows a method 600 for learning a binary classifier 604 according to our invention. The method 600 begins with a set of M training samples 601, i.e., a vector $T=\{x_1, \ldots, x_M\}$. The training samples $x \in R^N$ have corresponding labels $\{y_1, \ldots, y_M\}$ where $y \in \{-1, +1\}$. There are $M_p$ samples with a label +1 and $M_n$ samples with a label −1. That is, the training samples 601 are labeled according two classes, thus, $M=M_p+M_n$. The set of input training samples 601 can be measured from real-world physical phenomena, digital images, or gathered from statistical data such as medical studies.

A linear hyperplane classifier according to the invention is defined by a discriminant function of the form $$f(x) = <w \cdot x> + b, \qquad (1)$$

where sgn $f(x) \in \{-1, +1\}$ denotes the binary classification. Under certain assumptions, Gaussianity in particular, an optimal hyperplane is defined by a projection vector w, and the bias b can be determined using standard statistical techniques based on class means and sample covariances for linear classifiers.

We make no assumptions about the distribution p(x) of the input samples, instead we want to search the space of all possible hyperplanes in order to learn the optimal classifier 604, i.e., the classifier that minimizes a discrimination error or empirical risk.

Naturally, it is impractical to search the space of all possible hyperplanes. Also, random sampling of this space is thoroughly misguided. It can be shown that the optimal projection vector w* lies in the span of the training data set itself.

If the span of the training data set T is S, and its orthogonal complement is $\bar{S}$, then $S \cap \bar{S} = 0$, i.e., the null set. By linear expansion onto these two subspaces, $w = w_S + w_{\bar{S}}$. However, because $<w_{\bar{S}} \cdot x> = 0, \forall x \in T$, only the $w_S$ component has any effect on the discriminant $<w \cdot x> + b$, by definition.

Therefore, every solution must lie in the span of the input data set T, including the optimal projection vector, $w^* \in S$.

Linear Hyperplanes

When searching for w*, our method 600 considers only hyperplanes having a surface normal to line segments connecting pairs of samples from opposite classes. Therefore, we first connect 610 pairs of dyadic training samples 601.

$$w_{ij} = \frac{x_i - x_j}{c} \quad y_i \neq y_j \; i < j \qquad (2)$$

where $y_i \neq y_j$ by definition, and i<j, for uniqueness. The term c is a constant scale factor. If we set $c = \|x_i - x_j\|$, then $w_{ij}$ becomes a unit-norm direction vector. Either way, the projection vector $w_{ij}$ is parallel to the line segment connecting any two samples $x_i$ and $x_j$ from opposite classes, i.e., a "dyadic pair." Hyperplanes of the set 602 are then formed 620 normal to the connecting line segments.

Figure 1:
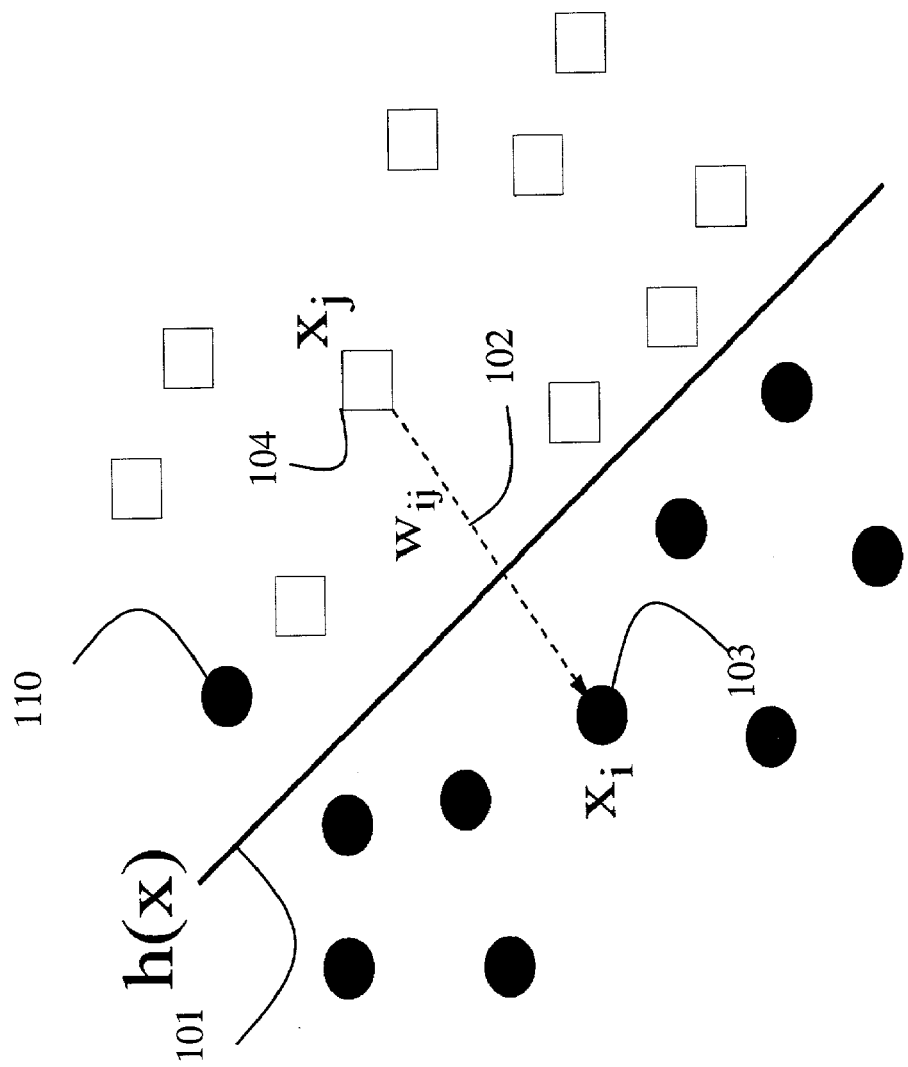
FIG. 1 is a diagram of a hyperplane discriminant through training samples according to the invention.

FIG. 1 shows a dyadic hyperplane h(x) 101 formed by the unit-norm projection vector $w_{ij}$ 102 connecting the opposing pair of dyadic training samples $(x_i, x_j)$ 103-104.

With an appropriate bias term $b_{ij}$, we obtain hyperplane discriminants of the form in Equation (1). Dyadic discriminants can be used to separate unlabelled test samples 605 into two classes 661–662. The space of possible classifiers to be searched includes a set of $|\{w_{ij}\}|=M_p M_n$ projection vectors, each of which has a free parameter $b_{ij}$ which is typically determined by minimizing a weighted classification error as described below.

Each hypothesis or classifier $h_{ij}(x)$ is then given by the sign of the discriminant as in Equation (1):

$$h_{ij}(x) = \text{sgn}(<w_{ij} \cdot x> + b_{ij}). \qquad (3)$$

We denote the complete set of hyperplanes 602 for the training data set 601 by $\{h_{ij}\} = \{w_{ij}, b_{ij}\}$. Strictly speaking, this set is uncountable because the tensor product with the scalar $b_{ij} \in R$ becomes infinite. However, because we always select a single optimal bias parameter for each hyperplane, we do in fact end up with only $M_p M_n$ classifiers.

FIG. 1 shows the hyperplane discriminant defined and constrained by the dyadic sample pair $(x_i, x_j)$. This induces the linear projection vector $w_{ij}$ as in Equation (2). Given this projection, the bias b is the only parameter to be optimized.

Optimization can be done by shifting the hyperplane 101 along the connecting line segment 102 so as to minimize the classification error. In this example, we see that one sample 110 can not be correctly labeled for this particular dyadic pair. The resulting classifier, with an error $\epsilon = 1/20$ (0.05), is then the "optimal'" hyperplane.

Note that given the projection vector $w_{ij}$, estimation of the "optimal'" bias parameter b is often a trivial one-dimensional line search, or if necessary, even an exhaustive search. The range or multiplicity of the b values for which a classifier may have the same minimal error does not concern us at this stage.

In contrast, we use boosting 200 to form a set of "strong'" hyperplanes 603 and maximize the margin of the final hyperplane or classifier 604 by combining 650 the strong hyperplanes.

The final classifier 604 can the be used to classify 660 a set of unlabelled test samples 605 in two classes 661–662.

Boosting

Boosting 200 provides a practical framework for combining selected strong classifiers 603 into the single final classifier 604 by means of linear combination and thresholding 650. Boosting maintains an iteratively evolving distribution, i.e., weights D(i), over the training samples 601 based on the difficulty of classification, e.g., samples that are harder to classify have a greater weight than those that are easier to classify. Consequently, each classifier $h(x): x \rightarrow \{+1, -1\}$ in the set 602 has a weighted classification error $$\varepsilon = \frac{1}{2} \sum_{i=1}^{M} D(i)|h(x_i) - y_i|. \tag{4}$$

In our case, in each round of boosting t, we select 630, from the complete set of $M_p M_n$ hyperplanes $h_{ij}$ 602 the one which minimizes a weighted classification error $\epsilon$. This is followed by re-weighting 640 the training samples 601 based on their classification or misclassification to obtain an updated distribution $D_{t+1}$.

Figure 2:
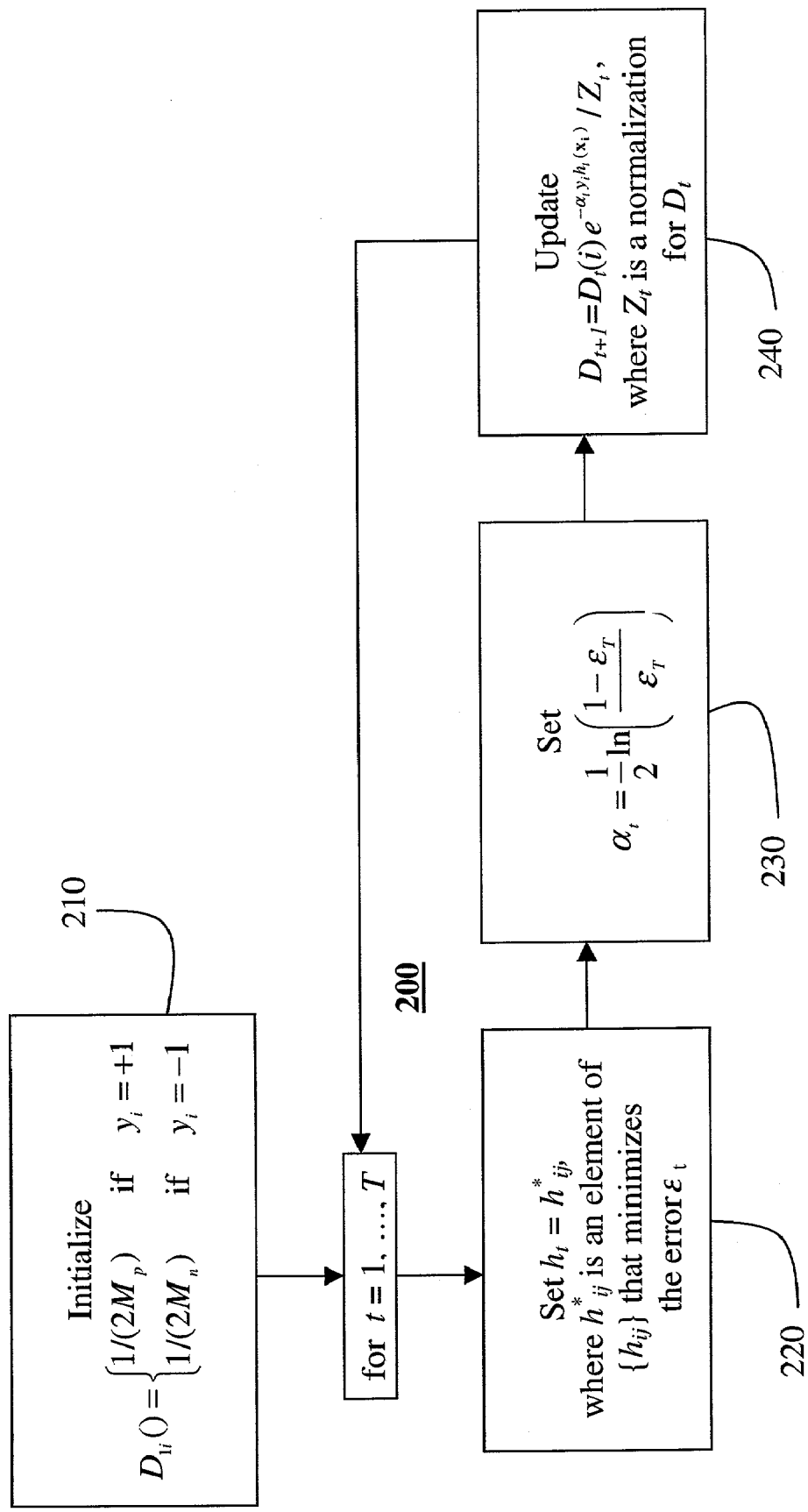
FIG. 2 is a flow diagram of a boosting process according to the invention.

FIG. 2 shows the process for boosting 200. In step 210, initialize $$D_{1i}() = \begin{cases} 1/(2M_p) & \text{if } y_i = +1 \\ 1/(2M_n) & \text{if } y_i = -1. \end{cases}$$

Then, iterate the following steps for $t=1, \ldots, T$. In step 220, set $h_t = h^*_{ij}$, where $h^*_{ij}$ is an element of $\{h_{ij}\}$ 602 that minimizes $\epsilon_t$. In step 230, set $$\alpha_t = \frac{1}{2} \ln\left(\frac{1-\varepsilon_T}{\varepsilon_T}\right).$$

Then, update the distribution $D_{t+1} = D_t(i) e^{-\alpha_t y_i h_t(x_i)/Z_t}$, where $Z_t$ is a normalization for $D_t$ in step 240, and repeat for the next increment of t until done.

The final classifier 604 is an alpha-weighted linear combination 650 of the selected weak classifiers $h_t$ and has the form of a weighted "voting" scheme $$H(x) = \text{sgn}\left(\sum_{t=1}^{T} \alpha_t h_t(x)\right). \tag{5}$$

The resulting upper bound on the training error is $$\prod_{t=1}^{T} Z_t. \tag{6}$$

The multiplicative shrinkage of this upper bound with each round of boosting is proof of the exponential convergence of the boosting process 200, and the often rapid reduction of the training error, sometimes all the way to zero.

Boosting belongs to the family of large margin classification processes like SVMs. With boosting, the margin of a sample (x, y) is given by $$\text{margin}(x, y) = \frac{y \sum_t \alpha_t h_t(x)}{\sum_t |\alpha_t|}, \tag{7}$$

which lies in the range [−1, +1], and is positive only if H correctly classifies the sample. The margin is often interpreted as a measure of confidence in the classification. Schapire et al. in "Improved boosting algorithm using confidence-rate prediction," The classifier $h_t(x)$ can be real-valued, as opposed to binary, and could be interpreted as a "confidence-rated prediction." In this case, the sign of $h_t(x)$ is the classification label, while the magnitude $|h_t(x)|$ is the confidence.

For such continuous-valued or "fuzzy" classifiers, we have $$\alpha_t = \frac{1}{2} \ln\left(\frac{1+r_t}{1-r_t}\right) \tag{8}$$

with $$r_t = \sum_i D_t(i) y_i h_t(x_i), \tag{9}$$

where the "correlation" $r_t$ is inversely related to the error by $\epsilon_t = (1 - r_t)/2$. In this case, the error of the resulting classifier H is bounded from above by $$\prod_{t=1}^{T} \sqrt{1 - r_t^2}. \tag{10}$$

Non-linear Hyperplanes

The logical extension beyond linear classifiers described above is to non-linear discriminants using positive definite "kernels" as described by Boser et al., see above. SVMs and recent non-linear advances such as kernel PCA, or the kernel Fisher discriminants as described by Scholkopf et al. rely on the property of "reproducing kernel Hilbert spaces." There, dot products with high-dimensional mappings $\Phi(x): X \rightarrow F$ are evaluated using Mercer kernels $$k(x, x') = \langle \Phi(x) \cdot \Phi(x') \rangle. \tag{11}$$

This has the desirable property that any process that is based on dot products, e.g., our linear hyperplane classifier in Equation (3) can non-linearly map the input samples, using kernels and implicitly perform dot-products in the transformed feature space. The pre-image of the linear hyperplane solution back in the input space is thus a non-linear hyperplane.

Using the above kernel property in Equation (2), we can rewrite the classifier in Equation (3) in non-linear form by first examining the linear classifier in the transformed feature space F where the projection vector is $$w_{ij} = \frac{\Phi(x_i) - \Phi(x_j)}{c} \quad i \neq y_j \; i < j \tag{12}$$

similar in form to Equation (2). Once again, we note that the optimal projection vector $w^*_{ij}$ must lie in the span $\Phi(x_i)$. Therefore, we restrict the search for an optimal non-linear hyperplane accordingly, for example, by considering pair-wise projection vectors.

But we can not directly evaluate $w_{ij}$ given the implicit nature of the non-linear mapping. However, we need only its dot product with the transformed input vectors $\Phi(x)$. Considering the linear discriminant in Equation (1), and substituting the above, we obtain $$f_{ij}(x) = \left\langle \frac{\Phi(x_i) - \Phi(x_j)}{c} \cdot \Phi(x) \right\rangle + b. \quad (13)$$

By now applying the kernel property in Equation 11, we obtain $$f_{ij}(x) = \frac{k(x, x_i) - k(x, x_j)}{c} + b_{ij}, \quad (14)$$

where the constant c can be set to normalize the range of the discriminant, e.g., with $c = \max_{ij} |k(x_i, x_j)|$.

The discrete-valued hyperplane classifier is given by a sign threshold $$h_{ij}(x) = \text{sgn}(f_{ij}(x)), \quad (15)$$

whereas a "confidence-rated" classifier with output in the range [−1, +1] can be obtained by passing $f_{ij}(\;)$ through a bipolar sigmoidal non-linearity, such as a hyperbolic tangent $$h_{ij}(x) = \tan h(\beta f_{ij}(x)),$$

where β determines the "slope" of the sigmoid.

To obtain a continuous-valued classifier that suitably occupies the range [−1, +1], the constants c and β can be adjusted. As for Equation (14), the scalar c depends on the range of the given training samples.

We add that non-linear hyperplanes can be optimization with respect to their kernel parameters, e.g., the width of the Gaussian kernels, or the order of polynomial kernels. However, in practice, a suitable set of kernel parameters is typically determined beforehand and fixed during the learning and boosting process. This is indeed the case with other kernel-based learning methods such as SVMs and radial basis functions (RBFs) where explicit search and optimization over the kernel parameters is quite prohibitive. However, we view this as a "model selection" problem rather than optimization of parameter settings of an individual classifier.

Example Applications

Figure 3B:
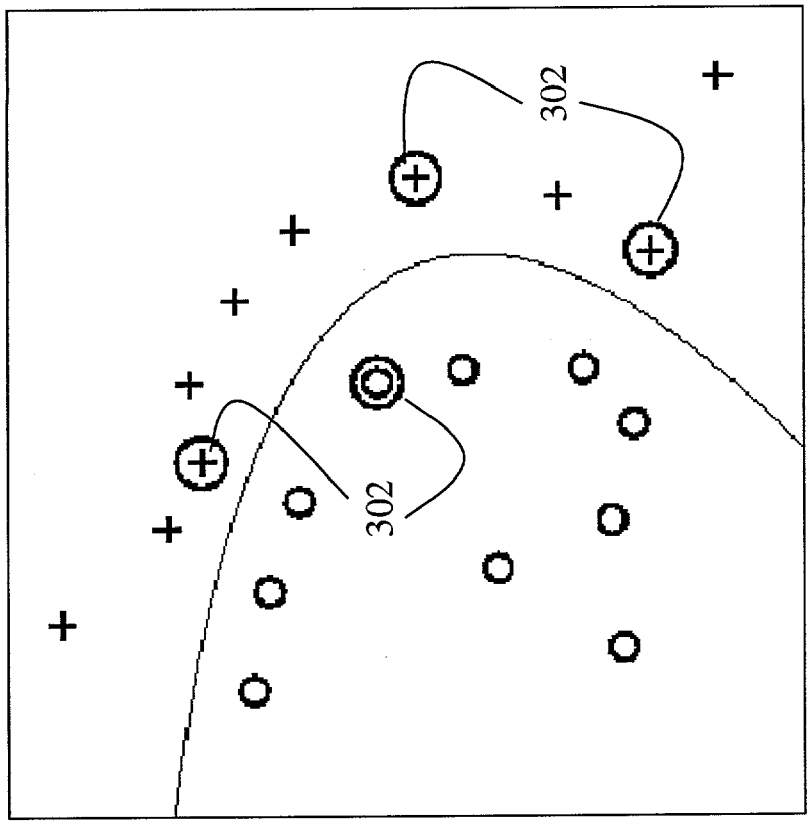
FIG. 3b is a diagram of classification according to the prior art.
Figure 3A:
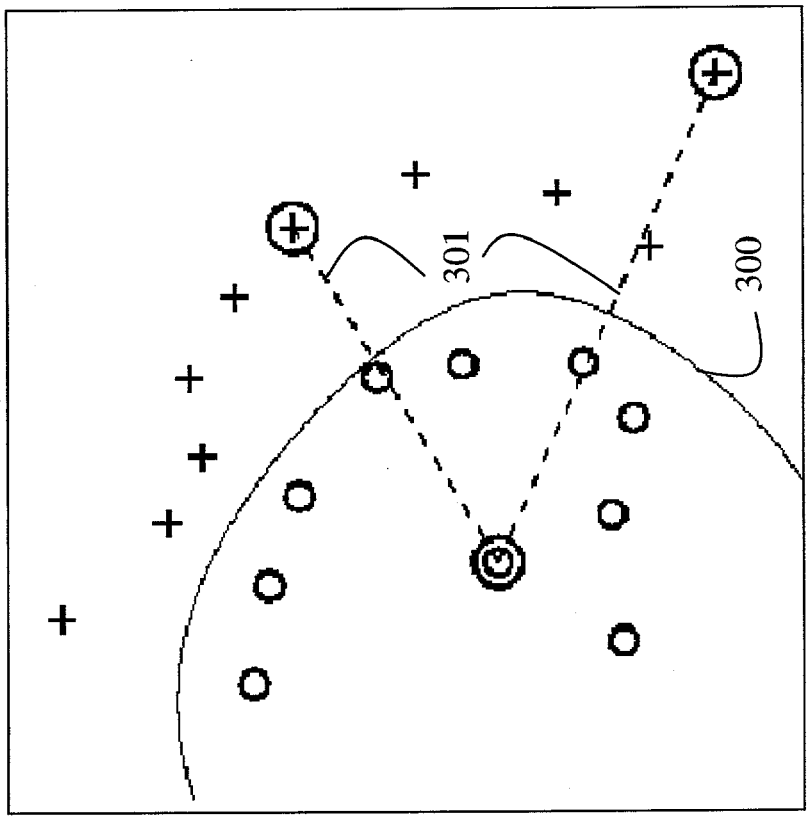
FIG. 3a is a diagram of classification according to the invention.

Before applying our method to well-known benchmarks, we describe a simple 2D non-linear dyadic hyperplane on an example problem, as shown in FIGS. 3a–b. We used a training data set of twenty samples with ten samples "+" and "o" in each class.

FIG. 3a shows classification of the training data with the method according to the invention. In this example application, Gaussian kernels are used. Our method solves this problem using only two iterations, i.e., two vectors 301 to define a discriminant hyperplane 300. Although the hyperplane 300 has a small margin of error and is skewed to one side, it can be seen that the dyadic samples pairs connected dashed lines 301 define the discriminant boundary 300.

For comparison with the prior art as shown in FIG. 3b, we used a Gaussian kernel SVM with the same data set. The SVM method solves this problem with four support vectors 302. Although the SVM method produces a better margin, our method produces a similar result with increased rounds of boosting.

When compared to the SVM method, the computational load of our method reduces to the total number of kernel evaluations required. Because every hyperplane requires two kernel evaluations, our classifiers uses half as many iterations as the number of support vectors used by the SVM method. In fact, the total number of kernel evaluations required by the hyperplane classifier is bounded by n/2, after n iterations of boosting, because a sample $x_i$ can be part of multiple projection vectors $w_{ij}$, and the corresponding kernels are evaluated only once. In the example application of FIGS. 3a–b, our method only requires three kernel evaluations, while the prior art method requires four.

Experimental Results

We empirically evaluated the performance of our method on a number of real-world data sets, and compared the performance of our method with prior art classification methods, namely, non-linear SVM with Gaussian RBF and linear kernels, and k-nearest neighbor (k-NN). All of these methods derive the final classifier from actual training samples.

We selected four data sets from the UCI repository of machine learning databases. These databases can be found in a file "MLRepository.html," at the Web site of UCI Repository of machine learning databases, Blake, C. L. and Merz, C. J., University of California, Irvine, Department of Information and Computer Science, 1998. The data sets we evaluated are given in Table A.

TABLE A

| Data Set | Dimensions | Size |
| --- | --- | --- |
| Sonar | 30 | 208 |
| Ionosphere | 34 | 351 |
| Statlog Hear Decease | 13 | 270 |
| Wisconsin Breast Cancer | 30 | 569 |

For evaluation purposes, each data set was randomly partitioned into a training set, a validation set, and a test set of equal ⅓ sizes of the full data sets. The parameters for the prior art methods, i.e., k for NN and σ for RBF kernels, were selected to yield a lowest error rate on the validation set, with the training set used for learning. These values were drawn from a range of twenty-five values for RBF kernel width, and k∈{1, 2, 3, . . . , 25} for the k-NN classifiers. The values of k selected by validation testing were 1 for Sonar, 3 for Ionosphere, 7 for Breast Cancer and 11 for Heart. In each trial, the hyperplane method according to the invention was tested after n/2 and n iterations, where n is the number of support vectors found by the SVM method in that trial. Note that we can control the size of our classifier by stopping the boosting process 200 after a predetermined number of iterations, and thus affect the accuracy of the classifier. In each trial, the number n of support vectors with the SVM was used as a basis to evaluate the error for two hyperplane classifiers: one with n/2 hyperplanes, which requires the same number of kernel evaluations as the SVM method, and one with n hyperplanes, with twice as much computation.

The box plots in FIGS. 4a–d show the distribution of errors. Each box spans the inter-quartile range of the distribution, with the middle line indicating the median value between the lower and upper quartiles of the distribution. The extending "whiskers" show the total span of the values. Note that FIG. 4d is scaled for better viewing.

The first observation from these empirical evaluations is that the RBF hyperplane method achieves test performance comparable to that of SVMs, and usually better than the k-NN classifier. The second observation is that an acceptable performance is achieved early in the rounds of boosting, with the number of hyperplanes equal to half that of support vectors, and sometimes with even less. Also, often the performance does not significantly improve with subsequent iterations.

Figure 5:
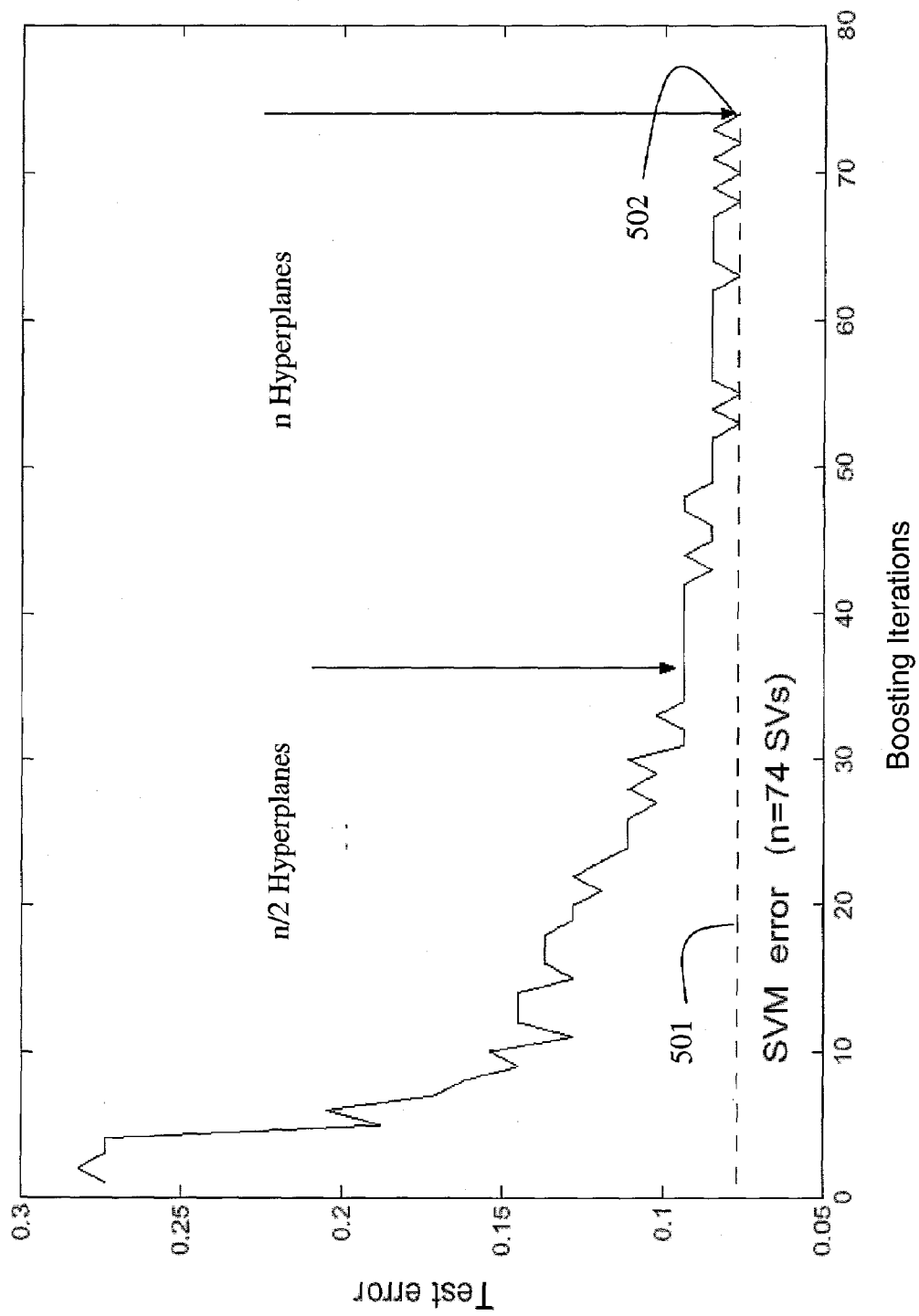
FIG. 5 is a graph of classification error as a function of boosting iterations.

FIG. 5 shows an example of the progress of our hyperplane method, in a trial run on the Ionosphere data set plotting trial error as a function of boosting iterations. The horizontal dashed base line 501 shows the performance of the SVM method, which in this case used 74 support vectors out of less than 120 training examples. The error 502 of our method approaches this baseline 501 after thirty iterations, and stays in its proximity, eventually converging to the same value.

We also experimented with hyperplanes with linear, i.e., dot product, kernels. In this case, the performance of linear hyperplanes is slightly less than that of the methods with RBF kernel. Actually, linear kernel hyperplanes result in non-linear discriminants due the soft-margin output function in Equation (16). When the $\beta$ value in Equation (16) is approximately zero, this leads to linear boundaries due to a superposition of planes. With a finite $\beta$ value, we get smooth curved hyperplanes. And with $\beta$ at infinity, we get a piecewise linear boundaries, which is the same as a hard classifier without confidence values. Also, our confidence-rated linear hyperplanes are essentially equivalent in performance to SVMs with a sigmoidal kernel.

In addition, optimization strategies can be used for sampling the hypothesis space of $M_p M_n$ possible hyperplanes based on the distribution $D_t(i)$ of Equation (4) to form hyperplanes that are not necessarily based on training samples and can, for example, be based on cluster centroids, or other derived samples based on the distribution of the input data set.

Effect of the Invention

The effect of the invention is two-fold. First, we provide a family of simple discriminants, i.e., hyperplanes, based on pairs of training samples from opposite classes, i.e., dyadic pairs, and extend this family to kernel hyperplanes by considering a non-linear mapping with Mercer type kernels. Second, we provide a "greedy" selection process based on boosting with confidence-rated, real-valued hyperplane classifiers with a continuous output in the interval [−1, 1].

We show that this new kernel-based approach to classification performs substantially the same as methods using SVMs, without having to solve large QP problems. Moreover, with our method, the computational complexity or model-order, is user-selectable so that we can trade-off performance for computation. We also benefit from a guarantee of exponential error shrinkage or convergence due to the boosting process. We are assured of margin maximization with increasing rounds of boosting.

We evaluated the generalization performance of our method on a number of standard machine learning data sets, and have shown a level of performance comparable to that of established prior art SVM methods, often with reduced classification time and reduced classifier size. We emphasize this performance advantage, because in practical applications, it is often desirable to minimize complexity even at the cost of increased training time.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A computer implemented method for learning a binary classifier for classifying samples into a first class and a second class, comprising the steps of:

acquiring a set of training samples from a physical system, each training sample labeled as either belonging to the first class of samples of the physical system or to the second class of samples of the physical system;

connecting pairs of dyadic samples by projection vectors, a first sample of each dyadic pair belonging to the first class and a second sample of each dyadic pair belonging to the second class;

forming a set of hyperplanes having a surface normal to the projection vectors;

selecting one hyperplane from the set of hyperplanes, the selected hyperplane minimizing a weighted classification error;

weighting the set of training samples according to a classification by the selected hyperplane;

combining the selected hyperplanes into a binary classifier; and repeating the selecting, weighting, and combining a predetermined number of iterations to obtain a final classifier for classifying test samples of the physical system into the first and second classes of the physical system.

2. The method of claim 1 wherein a linear hyperplane is defined by a discriminant function of the form $f(x) = \langle w \cdot x \rangle + b$, where w is the projection vector w, and b is a bias, and sgn $f(x) \in \{-1, +1\}$ denotes a binary classification.

3. The method of claim 2 wherein the projection vector is $$w_{ij} = \frac{x_i - x_j}{c},$$

where $x_i$ is the sample from the first class and $x_j$ is the sample from the second class, and c is a constant scale factor.

4. The method of claim 1 wherein each training of M samples $x_i$ has a weight $D(i)$, and each hyperplane $h(x): x \to \{+1, -1\}$ in the set of hyperplanes has a weighted classification error $$\varepsilon = \frac{1}{2} \sum_{i=1}^{M} D(i) |h(x_i) - y_i|.$$

5. The method of claim 1 wherein the final classifier is an alpha-weighted linear combination of the selected classifiers.

6. The method of claim 1 further comprising:

mapping the set of training samples with kernels by performing a dot product with kernels to produce non-linear hyperplanes.

7. The method of claim 6 wherein the projection vector is $$w_{ij} = \frac{\Phi(x_i) - \Phi(x_j)}{c},$$

where $x_i$ and $x_j$ are a particular pair of dyadic samples, c is a constant scale factor, and $\Phi$ defines the kernel.

8. The method of claim 6 wherein the kernel is a Gaussian function.

9. The method of claim 6 wherein the kernel is a radial basis function.

10. The method of claim 1, in which the test samples are sonar signals acquired from a sonar system.

11. The method of claim 1, in which the test samples are cardiac signals.

12. The method of claim 1, in which the test samples are breast cancer data.

13. The method of claim 1, further comprising:

acquiring the test samples from the physical system; and classifying the test samples as a class using the final classifier.

14. The method of claim 13, further comprising:

outputting the class a a confidence value in a range [−1, +1].

* * * * *